United States Patent
Knagge

(10) Patent No.: US 7,388,156 B2
(45) Date of Patent: Jun. 17, 2008

(54) GASKET FOR A CABLE CONTROL LINE IN AN ENGINE COMPARTMENT

(75) Inventor: Martin Knagge, Seesen (DE)

(73) Assignee: Teleflex Automotive Germany GmbH, Dassel (DE)

( * ) Notice: Subject to any disclaimer, the term of this patent is extended or adjusted under 35 U.S.C. 154(b) by 136 days.

(21) Appl. No.: 11/435,911

(22) Filed: May 17, 2006

(65) Prior Publication Data

US 2007/0137892 A1    Jun. 21, 2007

(30) Foreign Application Priority Data

Dec. 15, 2005    (DE) .................. 10 2005 060 494

(51) Int. Cl.
*H01B 17/26* (2006.01)
(52) U.S. Cl. .............. 174/152 G; 174/153 G; 174/152; 174/64; 16/2.1; 439/277; 248/56
(58) Field of Classification Search ........ 174/650–669, 174/152 G, 64, 153 G, 152; 16/2.1, 2.2; 439/604, 277; 248/56, 68.1; 277/606
See application file for complete search history.

(56) References Cited

U.S. PATENT DOCUMENTS

| | | | | |
|---|---|---|---|---|
| 4,684,190 A | * | 8/1987 | Clark et al. | .................. 439/587 |
| 5,603,304 A | * | 2/1997 | Matczak | .................... 123/509 |
| 6,286,481 B1 | * | 9/2001 | Bos et al. | .................... 123/399 |
| 7,126,064 B1 | * | 10/2006 | Shemtov | ..................... 174/662 |
| 7,251,409 B2 | * | 7/2007 | Shakeri | ....................... 385/138 |
| 7,282,650 B2 | * | 10/2007 | Czuhanich et al. | ........ 174/659 |
| 7,288,730 B2 | * | 10/2007 | Habel et al. | ................ 174/650 |

* cited by examiner

*Primary Examiner*—Dhiru R Patel
(74) *Attorney, Agent, or Firm*—Baker & Hostetler LLP

(57) ABSTRACT

A gasket for the passage of at least one cable control line in the wall of an engine compartment, principally the engine chamber of motor vehicles, with the gasket being premounted on the cable control line and closing the engine compartment opening for the cable control line quickly and tightly, and having a slider. The gasket has a circumferential groove for the wall of the engine compartment, a recess for a slider, at least one opening for the cable control line, and at least one mounting groove for mounting clips of a slider. The slider has bridges and mounting clips that engage in the mounting grooves of the gasket. There is also a blocking lip on the gasket, which in the mounted state prevents the slider from sliding back, and a pull device on the slider.

14 Claims, 3 Drawing Sheets

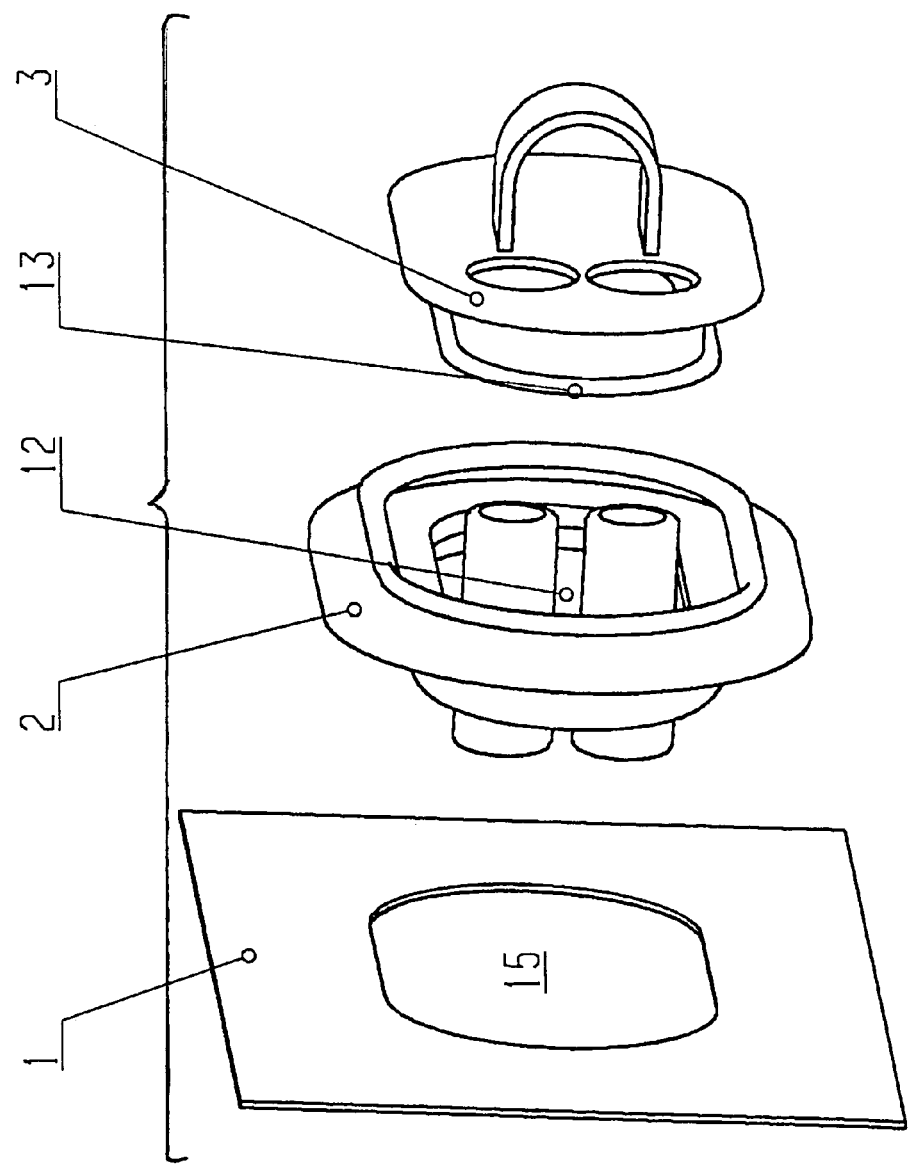

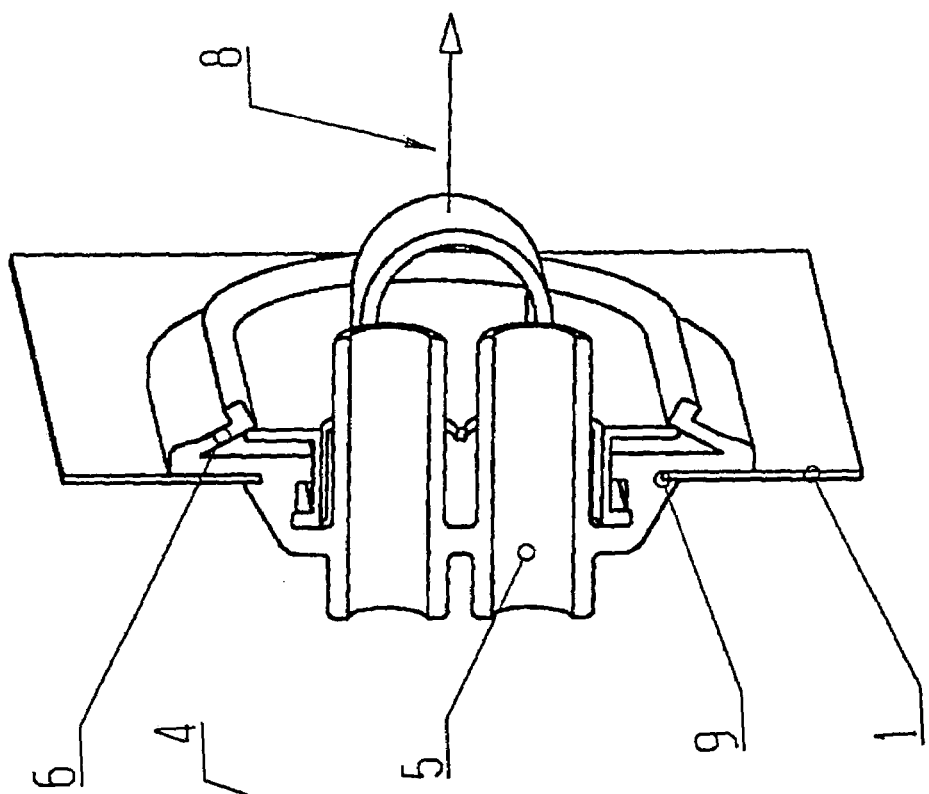
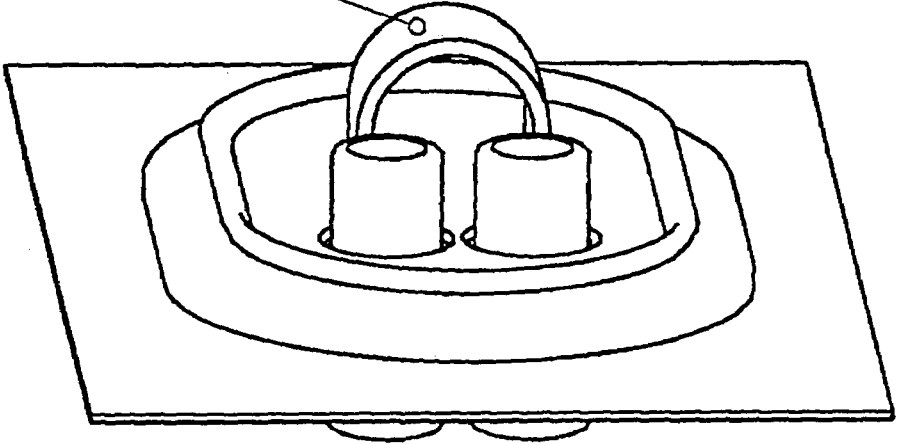

GASKET FOR A CABLE CONTROL LINE IN AN ENGINE COMPARTMENT

BACKGROUND OF THE INVENTION

1. Field of the Invention

The invention relates to a gasket that can be used wherever one or more cable control lines lead into an engine compartment and have to be sealed off quickly and reliably from the housing or the wall of the engine compartment. The invention can be used especially where engine compartments of motor vehicles have cable control lines that require fast and secure assembly. Cable control lines are very generally mounted in these engine compartments on flat belts. For the supplied and preassembled cable control lines to be mounted, there is frequently the requirement that they be mounted quickly in the wall of the motor vehicle's engine compartment, for which the gasket is to be mounted with exact fit with low tolerances, gas-tight and liquid-tight, with fast and secure mounting. Similar requirements also apply when replacement of the cable control line is necessary in the repair shop.

2. The Prior Art

According to the present state of the art, cable control lines that are provided with a closure gasket are fitted by a tool in the opening of the wall of the engine compartment, which is labor-intensive. Special tools are often necessary. Because of the tool used and the small differences between the gasket and the opening, the gasket can be damaged, which results in high service costs. The same also applies to the repair and maintenance of these gaskets.

SUMMARY OF THE INVENTION

Therefore, it is the task of the invention to develop a gasket for the passage of control cable lines into an engine compartment that is suitable for fast and secure mounting of cable control lines in the engine housing, whereby a high degree of tightness is to be achieved.

This task is accomplished according to the invention by a gasket for the passage of at least one control cable line in the engine compartment that basically consists of two parts, namely a gasket of elastic material, with rubber being especially suitable, and a slider. The gasket fits into the opening in the wall of the engine compartment, with the shape of the gasket being such that an encircling groove in the gasket makes the gasket tight in the wall of the engine compartment so that it can be fitted in solidly. If the gasket consists of soft and stable rubber, it can easily be fitted directly into the opening in the wall. One or more openings in the gasket for cable control lines make(s) it possible to mount the gasket ahead of time on the cable control line(s). It is advantageous in this case for the opening or openings to have grommets along the cable control lines that enclose the shifting or selector control line of the shift assembly and give it adequate stability.

As another part, the gasket has a slider with bridges and mounting clips that engage in the mounting grooves of the gasket. There is an air cushion between the surface of the gasket and the slider that facilitates mounting. The distance of the mounting clips from the slider should be large enough that a force can be exerted on the bottom of the gasket by the mounting clip, so that the latter is drawn into the passage in the wall. It is advantageous here if the side of the gasket facing the wall is chamfered so that the gasket can be drawn more easily into the passage in the wall. It is also advantageous to introduce a noise-damping and/or a heat-insulating agent into the cavity that exists between the slider and the gasket. This agent can also be injected after assembly by suitable measures, which has the advantage that this region in which a high noise level exists, according to experience, and higher temperatures are also found, is given additional insulation. Partial filling of the cavity with noise- and heat-insulating material is also conceivable. The gasket should advantageously consist of very soft material so that it can be mounted quickly and easily in the passage in the wall, while the slider, on the other hand, consists of rigid material, plastic for example. The slider should advantageously have one or more passages for the control line cables.

The slider can also be made with no passages, for example as a two-part frame in the gasket. It is critical for the slider to move in the gasket and to brace it.

It is advantageous to configure the grommets of the openings for the cables long enough for them to extend out of the opening(s) in the slider.

So that the slider can be held by the gasket, the gasket has a recess in its interior that corresponds to the greatest extent to the shape of the slider. A pulling device is placed on the slider for more favorable assembly. This can be a pull ring for the assembler.

In the side facing the gasket, the slider also has a support bridge on which the mounting clips are located. These mounting clips, which can be made circumferentially, engage in a mounting groove in the gasket and thus brace it in the opening against the wall. The slider can be connected to the gasket when it is installed. It is drawn out of the gasket after it is mounted, with the mounting clips acting against the mounting grooves and thus bracing the gasket in the engine compartment opening.

There is a blocking lip on the surface of the gasket that prevents the pulled slider from staying braced and not sliding back again. It is advantageous for the blocking lip to have an over-arched edge. The slider is easier to assemble with this edge.

It is also advantageous for there to be at least two mounting grooves in the gasket for the mounting clips. More mounting grooves are also conceivable.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows an exploded view of the wall of the engine compartment with the rubber wall gasket prior to mounting, and the slider to be inserted therein;

FIG. 2*a* shows a mounted wall gasket with slider in plan view;

FIG. 2*b* shows a cross-sectional view of the mounted wall gasket with slider of FIG. 2*a*;

DETAILED DESCRIPTION OF THE PREFERRED EMBODIMENT

Figure 3:
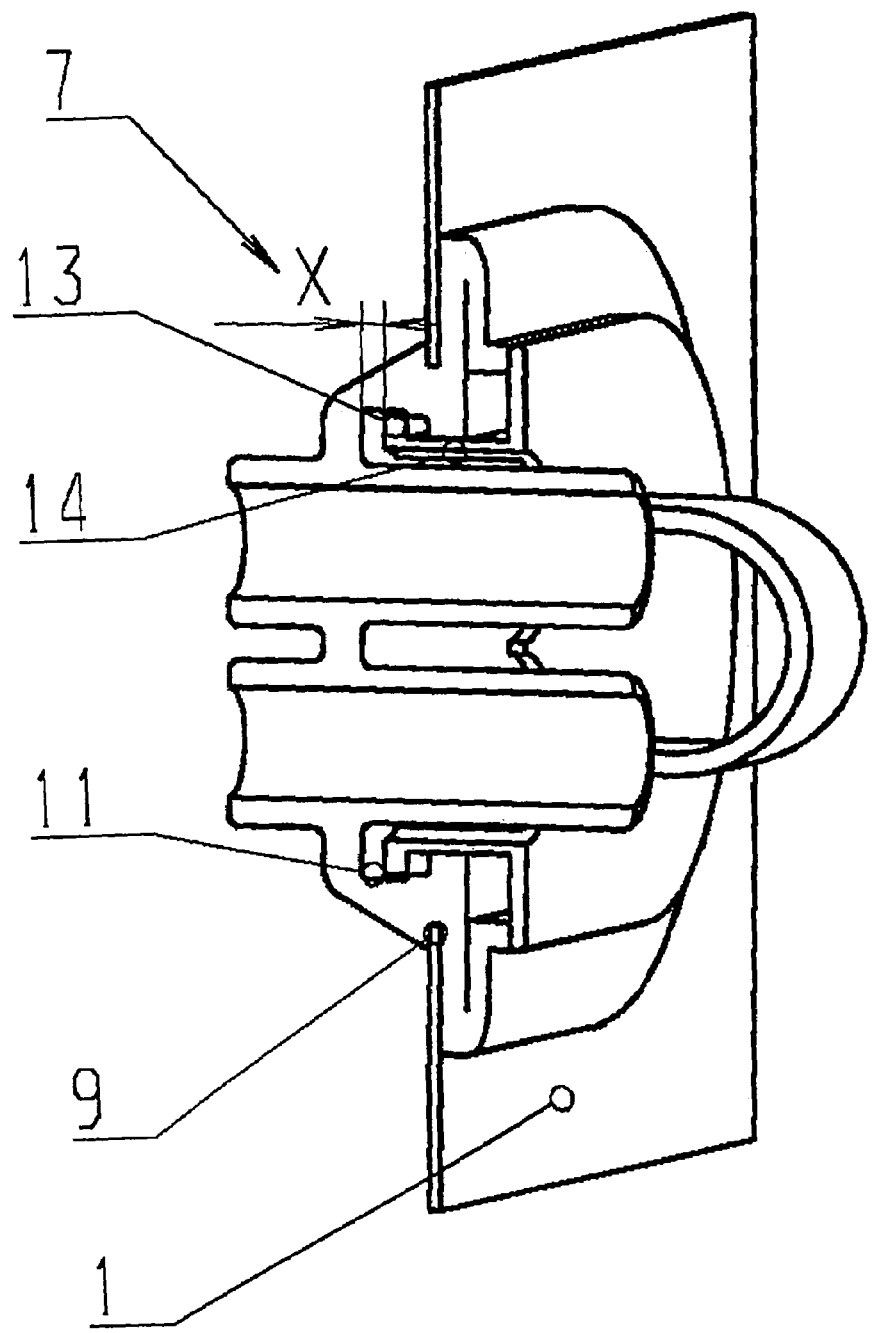
FIG. 3 shows a cross-sectional view of a gasket after mounting in the wall and prior to tightening the slider, without cable control lines.

Referring now in detail to the drawings, FIG. 1 shows the wall 1 of a motor vehicle transmission in which there are an opening 15, a gasket 2 with a recess 12 for slider 3, and slider 3 with a mounting clip 13, which is circumferential and is located on a holding bridge 14, with slider 3 having two holes 10 for two cable control lines and a pull device 4 for the assembler.

In FIGS. 2a and 2b, the gasket 2 has been inserted into the wall 1 of the engine compartment, with slider 3 in mounted position, in other words the blocking lip 6 is over slider 3. Blocking lip 6 has an over-arched edge. No cable control lines have been drawn in the openings 5 for the cable control lines. Of course these are already premounted in openings 5 during assembly. The grommets of the openings 5 in which the cables are located have a length that extends out of slider 3. This makes gasket 2 easier to mount. For this purpose, gasket 2 with inserted slider 3 is inserted in passage 15 through wall 1, and pressure is exerted by the assembler on the part 4, the pull device. Because of the air cushion between the slider 3 and the gasket, the slider can be pressed into the gasket, which causes the circumferential mounting clip 13 to act against the gasket and to pull it into the passage 15, whereby the circumferential groove 9 engages.

Circumferential groove 9 provides for gasket 2 to rest firmly on wall 1. Blocking lip 6 holds slider 3 firmly against gasket 1 prior to mounting, and after mounting it provides that slider 3 cannot be restored back to its starting position. For the further mounting, slider 3 is moved in direction 8 by means of pull device 4, so that mounting clip 13 is pushed onto another mounting groove 11, and blocking lip 6 goes beneath slider 3. This makes slider 3 unable to be moved back into its starting position, and it exerts a pulling force acting on mounting clip 13 that presses gasket 2 against wall 1 of the engine compartment and thus produces a tight seal. The space between gasket 2 and slider 3 can be filled completely or partially with insulating material, for example with foam.

This is also shown in FIG. 3, which shows that mounting clip 13 is moved by the amount X relative to mounting groove 11, so that gasket 2 is pressed firmly to the wall of the engine compartment 1 when gasket 2 is mounted.

The proposed gasket 2 has the advantage that cable control lines on which the seals are premounted can be mounted in the wall of an engine compartment of a motor vehicle quickly and with a high degree of tightness without a tool.

Accordingly, while only a few embodiments of the present invention have been shown and described, it is obvious that many changes and modifications may be made thereunto without departing from the spirit and scope of the invention.

LIST OF REFERENCE SYMBOLS USED

1 Wall of the engine compartment
2 Gasket/rubber wall seal
3 Slider
4 Pull device of 3
5 Opening for cable control line
6 Blocking lip of 2
7 Mounting stroke
8 Pull seal for 3 for mounting
9 Circumferential groove for 1
10 Hole for cable control line in 3
11 Mounting groove for 13
12 Recess in 2 for 3
13 Mounting clip of holding bridge 14
14 Holding bridge
15 Opening in 1

What is claimed is:

1. A gasket for the passage of at least one cable control line in the wall of an engine compartment, comprising:
    a gasket body having the following features:
    a circumferential groove for the wall of the engine compartment;
    a recess for a slider;
    at least one of a plurality of openings for the cable control line; and at least one mounting groove for mounting clips of a slider; and
    said slider with bridges and the mounting clips that engage in the mounting grooves of the gasket;
    a blocking lip on the gasket, which in a mounted state prevents the slider from sliding back, and a pull device on the slider,
    wherein the gasket is premounted on the cable control line and closes the engine compartment opening for the cable control line quickly and tightly.

2. The gasket according to claim 1, wherein the gasket consists of elastic material.

3. The gasket according to claim 1, wherein there are two openings in the gasket for accepting cable control lines.

4. The gasket according to claim 1, wherein said plurality of openings for the cable control line are made as grommets along the cable control line.

5. The gasket according to claim 1, wherein there is a passage for cable control lines in the slider.

6. The gasket according to claim 5, wherein there is a passage in the slider for each cable control line.

7. The gasket according to claim 1, wherein the slider consists of plastic.

8. The gasket according to claim 1, wherein there are at least two mounting grooves side by side on the gasket.

9. The gasket according to claim 1, wherein the blocking lip has an over-arched edge.

10. The gasket according to claim 1, wherein the grommet of the opening is so long that it extends out of the slider after installation.

11. The gasket according to claim 1, wherein the side of the gasket facing the wall is chamfered.

12. The gasket according to claim 1, wherein there is an air cushion in the recess between the gasket and the slider that facilitates mounting of the slider.

13. The gasket according to claim 1, wherein the recess between the gasket and the slider is filled at least partially with a noise dampening or a heat-insulating medium.

14. The gasket according to claim 1, wherein the distance of the mounting clip from the slider is of such a size that the gasket is pulled into the passage through the wall.

* * * * *